(12) United States Patent
Choi et al.

(10) Patent No.: US 12,113,268 B2
(45) Date of Patent: Oct. 8, 2024

(54) ANTENNA-INSERTED ELECTRODE STRUCTURE AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Jae Hyun Lee, Gyeonggi-do (KR); Chang Jun Maeng, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 170 days.

(21) Appl. No.: 17/895,262

(22) Filed: Aug. 25, 2022

(65) Prior Publication Data
US 2022/0416402 A1   Dec. 29, 2022

Related U.S. Application Data (63) Continuation of application No. PCT/KR2021/000435, filed on Jan. 13, 2021.

(30) Foreign Application Priority Data

Feb. 25, 2020   (KR) .................. 10-2020-0022987

(51) Int. Cl.
*G06F 3/044* (2006.01)
*G06F 3/041* (2006.01)
(Continued)

(52) U.S. Cl.
CPC ......... *H01Q 1/2266* (2013.01); *G06F 3/0412* (2013.01); *G06F 3/04164* (2019.05);
(Continued)

(58) Field of Classification Search
CPC .... G06F 3/0446; G06F 3/0448; G06F 3/0443; G06F 3/0412; H01Q 1/2266; H01Q 21/08
See application file for complete search history.

(56) References Cited

U.S. PATENT DOCUMENTS

2011/0193796 A1 *   8/2011   Cho .................. G06F 3/0443
                                                   345/173
2013/0207911 A1     8/2013   Barton et al.
(Continued)

FOREIGN PATENT DOCUMENTS

JP      2011-165159 A      8/2011
KR  10-2013-0095451 A      8/2013
(Continued)

OTHER PUBLICATIONS

International Search Report for PCT/KR2021/000435 mailed on Apr. 22, 2021.
(Continued)

*Primary Examiner* — Kevin M Nguyen
(74) *Attorney, Agent, or Firm* — The PL Law Group, PLLC (57) ABSTRACT

An antenna-inserted electrode structure of an embodiment includes a substrate layer including a touch sensing region and an antenna-touch sensing region, first sensing electrodes arranged in the touch sensing region of the substrate layer, second row sensing electrodes and second column sensing electrodes arranged in the antenna-touch sensing region of the substrate layer, second bridge electrodes configured to connect the second row sensing electrodes adjacent to each other in a row direction, second connection parts configured to connect the second column sensing electrodes adjacent to each other in a column direction, and antenna units. The antenna units respectively include radiators which are disposed in the antenna-touch sensing region of the substrate layer, have an area larger than each of the second row sensing electrode and the second column sensing electrode, and are disposed by avoiding the second bridge electrodes and the second connection parts in a planar direction.

20 Claims, 5 Drawing Sheets

(51) Int. Cl.
  H01Q 1/22 (2006.01)
  H01Q 21/08 (2006.01)
(52) U.S. Cl.
  CPC .......... *G06F 3/0443* (2019.05); *G06F 3/0446* (2019.05); *G06F 3/0448* (2019.05); *H01Q 21/08* (2013.01); *G06F 2203/04111* (2013.01); *G06F 2203/04112* (2013.01)

(56) References Cited

U.S. PATENT DOCUMENTS

| | | |
|---|---|---|
| 2014/0176819 A1 | 6/2014 | Yilmaz |
| 2015/0255856 A1* | 9/2015 | Hong .................. H01Q 21/061 343/702 |
| 2016/0328057 A1 | 11/2016 | Chai et al. |
| 2017/0083153 A1 | 3/2017 | Yeh et al. |
| 2021/0318730 A1 | 10/2021 | Lee et al. |
| 2023/0059699 A1* | 2/2023 | Li ....................... H01Q 1/2266 |

FOREIGN PATENT DOCUMENTS

| | | | |
|---|---|---|---|
| KR | 10-2016-0080444 A | 7/2016 | |
| KR | 10-2017-0096866 A | 8/2017 | |
| KR | 10-2018-0026597 A | 3/2018 | |
| KR | 10-2018-0101064 A | 9/2018 | |
| KR | 10-2019-0105812 A | 9/2019 | |
| KR | 10-2019-0108870 A | 9/2019 | |
| WO | WO 2013/063176 A1 | 5/2013 | |
| WO | WO-2021151483 A1 * | 8/2021 | ........... G06F 3/0443 |

OTHER PUBLICATIONS

Notice of Allowance issued on May 28, 2024 Japan Intellectual Property Office in a counterpart Japanese Patent Application No. 2022-551271 (all the cited references are listed in this IDS.) (English translation is also submitted herewith.).

* cited by examiner

ANTENNA-INSERTED ELECTRODE STRUCTURE AND IMAGE DISPLAY DEVICE INCLUDING THE SAME

CROSS-REFERENCE TO RELATED APPLICATION AND CLAIM OF PRIORITY

The present application is a continuation of application to International Application No. PCT/KR2021/000435 with an International Filing Date of Jan. 13, 2021, which claims the benefit of Korean Patent Applications No. 10-2020-0022987 filed on Feb. 25, 2020 at the Korean Intellectual Property Office, the disclosures of which are incorporated by reference herein in their entirety.

BACKGROUND

1. Field of the Invention

The present invention relates to an antenna-inserted electrode structure and an image display device including the same, and more specifically, to an antenna-inserted electrode structure including antenna units and sensing electrodes, and an image display device including the same.

2. Description of the Related Art

Recently, electronic devices capable of inputting a command of a user by selecting instructions displayed on a screen of an image display device with a finger of the user or an object such as a touch pen or a stylus pen have been developed in various forms such as a tablet PC form, for example.

In addition, the image display device has been coupled with a communication device such as a smart phone. Accordingly, an antenna for implementing communication in high frequency or ultra-high frequency (e.g., 3G, 4G, 5G or higher) bands may be mounted in the image display device.

As described above, when mounting a touch sensor and the antenna in one image display device, a design for inserting a plurality of electrodes within a limited space is required. Further, due to the antenna, a connection between sensing electrodes of the touch sensor may be disconnected or a resistance in a sensing channel may be increased.

Accordingly, it is preferable to design an antenna and a touch sensor having improved driving stability while enhancing space efficiency.

SUMMARY

It is an object of the present invention to provide an antenna-inserted electrode structure having improved electrical characteristics and space efficiency.

Another object of the present invention is to provide an image display device including the antenna-inserted electrode structure having improved electrical characteristics and space efficiency.

To achieve the above objects, the following technical solutions are adopted in the present invention.

1. A antenna-inserted electrode structure including: a substrate layer including a touch sensing region and an antenna-touch sensing region; first sensing electrodes arranged in the touch sensing region of the substrate layer; second row sensing electrodes and second column sensing electrodes which are arranged in the antenna-touch sensing region of the substrate layer; second bridge electrodes configured to connect the second row sensing electrodes adjacent to each other in a row direction; second connection parts configured to connect the second column sensing electrodes adjacent to each other in a column direction; and a plurality of antenna units respectively including radiators which are disposed in the antenna-touch sensing region of the substrate layer, and are disposed by avoiding the second bridge electrodes and the second connection parts in a planar direction.
2. The antenna-inserted electrode structure according to the above 1, wherein the second row sensing electrodes are disposed around the radiator, and include sub-row sensing electrodes having a bar pattern or a bent pattern shape extending along an edge of the radiator.
3. The antenna-inserted electrode structure according to the above 1, wherein the second connection parts include a modified connection part which extends along an edge of the radiator around the radiator and includes a bent portion.
4. The antenna-inserted electrode structure according to the above 1, wherein the first sensing electrodes include: first row sensing electrodes and first column sensing electrodes; first bridge electrodes configured to connect the first row sensing electrodes adjacent to each other in the row direction; and first connection parts configured to connect the first column sensing electrodes adjacent to each other in the column direction.
5. The antenna-inserted electrode structure according to the above 4, wherein the first row sensing electrode and the second row sensing electrode have the same area, and the first column sensing electrode and the second column sensing electrode have the same area.
6. The antenna-inserted electrode structure according to the above 4, wherein the first row sensing electrode has a larger area than the second row sensing electrode, and the first column sensing electrode has a larger area than the second column sensing electrode.
7. The antenna-inserted electrode structure according to the above 6, wherein the second row sensing electrode and the second column sensing electrode correspond to 4n-division (n is a natural number) of the first row sensing electrode and the first column sensing electrode, respectively.
8. The antenna-inserted electrode structure according to the above 6, wherein the first row sensing electrodes are connected with each other in the row direction to form first sensing electrode rows, and the second row sensing electrodes are connected with each other in the row direction to form second sensing electrode rows.
9. The antenna-inserted electrode structure according to the above 8, further including: first row traces which extend from each of the first sensing electrode rows in the touch sensing region; and a second row trace which merges the plurality of second sensing electrode rows and extends in the antenna-touch sensing region.
10. The antenna-inserted electrode structure according to the above 1, wherein all the first sensing electrodes, the second row sensing electrodes, the second column sensing electrodes, and the antenna units are disposed on the same layer or at the same level.
11. The antenna-inserted electrode structure according to the above 1, wherein the antenna unit further includes a transmission line extending from the radiator.

12. The antenna-inserted electrode structure according to the above 11, wherein the radiator and the transmission line have a mesh structure.
13. The antenna-inserted electrode structure according to the above 12, wherein the first sensing electrodes, the second row sensing electrodes, and the second column sensing electrodes have the same mesh structure as the radiator.
14. The antenna-inserted electrode structure according to the above 13, wherein the second bridge electrodes have a solid structure.
15. The antenna-inserted electrode structure according to the above 12, further including a dummy mesh pattern which surrounds peripheries of the radiator.
16. The antenna-inserted electrode structure according to the above 12, wherein the antenna unit further includes a signal pad connected to one end of the transmission line and having a solid pattern structure.
17. The antenna-inserted electrode structure according to the above 1, wherein the radiator has a larger area than an area of each of the second row sensing electrode and the second column sensing electrode.
18. The antenna-inserted electrode structure according to the above 17, wherein each of the second row sensing electrode or the second column sensing electrode corresponds to 4n-division (n is a natural number) of the radiator.
19. The antenna-inserted electrode structure according to the above 1, wherein central portions of the radiators are disposed between alignment lines in which the second bridge electrodes and the second connection parts are respectively arranged in the planar direction.
20. An image display device including the antenna-inserted electrode structure according to the above 1.

In the antenna-inserted electrode structure according to embodiments of the present invention, the radiator of the antenna unit may be disposed by avoiding connection parts and/or bridge electrodes for connecting the sensing electrodes of the touch sensor with each other. Thereby, it is possible to prevent junction parts of the sensing electrodes from being disconnected due to the radiator inserted therein, and maintain a desired touch sensing sensitivity even when inserting the antenna unit.

In some embodiments, the sensing electrodes around the radiator may be formed to have the same shape as the radiator, and have a smaller area than the radiator. Thereby, the antenna unit may be easily arranged so as not to be completely overlapped with the bridge electrodes and/or the connection parts.

In some embodiments, the radiator and the sensing electrodes may have a mesh structure, and a dummy mesh pattern may be further included between the radiator and the sensing electrodes. Thereby, it is possible to prevent the electrodes from being viewed, and improve transmittance and image characteristics in the display region of the image display device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Embodiments of the present invention provide an antenna-inserted electrode structure, in which antenna units and sensing electrodes are arranged together in the same plane, as well as an image display device including the antenna-inserted electrode structure.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

The terms "column direction" and "row direction" as used herein do not refer to an absolute direction, but are used in a relative meaning for referring to two directions different from each other.

Figure 1:
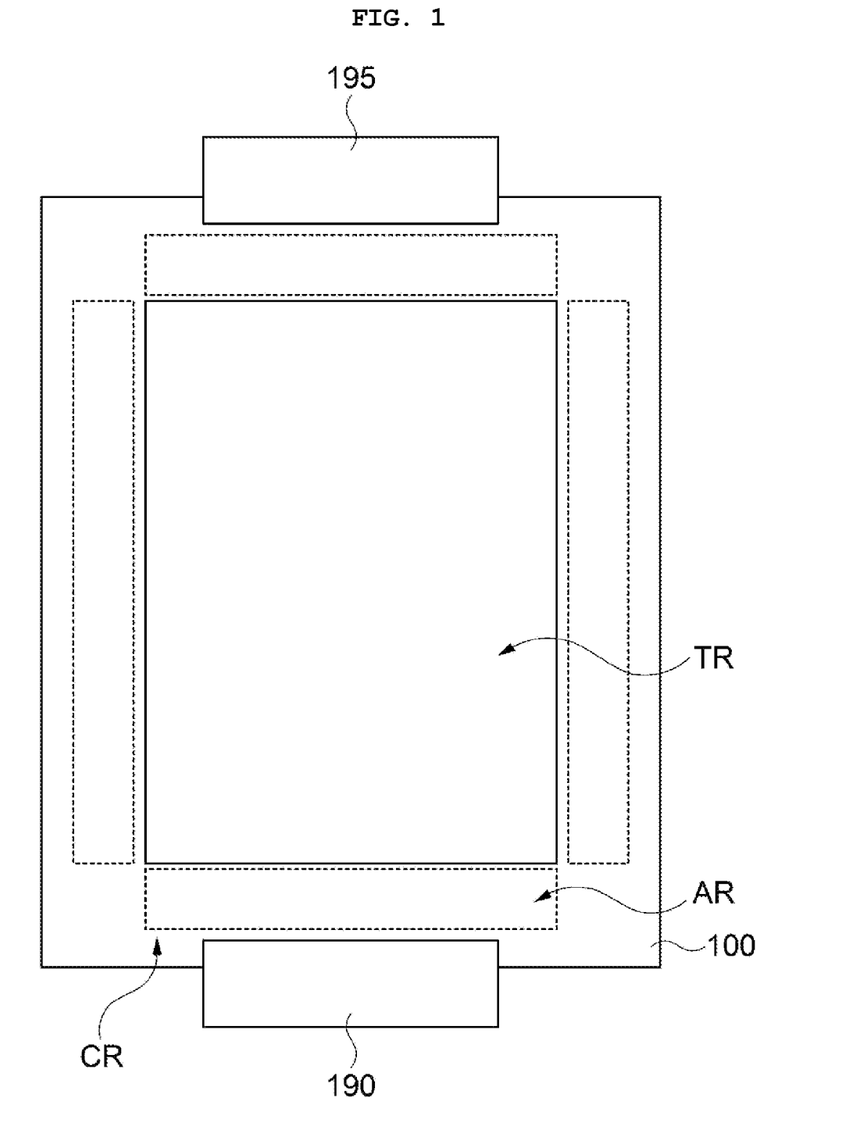
FIG. 1 is a schematic plan view illustrating regions of an antenna-inserted electrode structure according to exemplary embodiments.

FIG. 1 is a schematic plan view illustrating regions of an antenna-inserted electrode structure according to exemplary embodiments.

For the convenience of description, in FIG. 1, sensing electrode and antenna unit are not illustrated, and configurations thereof will be described below in more detail with reference to FIG. 2.

Referring to FIG. 1, the touch sensor-antenna structure may include a substrate layer 100 on which sensing electrodes and antenna units are arranged.

The substrate layer 100 or the antenna-inserted electrode structure may include a touch sensing region TR, antenna-touch sensing regions AR, and a circuit connection region CR.

The touch sensing region TR includes a central portion of the substrate layer 100, and may be provided as an active region of a substantial touch sensor through which an input by a touch of a user is sensed.

The antenna-touch sensing regions AR (illustrated by dotted lines in FIG. 1) may be disposed adjacent to at least one of both ends and both sides of the touch sensing region TR.

For example, in one embodiment, the antenna-touch sensing region AR may be disposed to be adjacent to one side or one end of the touch sensing region TR. In one embodiment, the antenna-touch sensing regions AR may be disposed continuously adjacent to one side and one end of the touch sensing region TR. In one embodiment, the antenna-touch sensing regions AR may be disposed so as to surround peripheral portions of the touch sensing region TR.

The antenna-touch sensing region AR may be, for example, a region in which an antenna unit for implementing mobile communication in high frequency or ultra-high frequency (e.g., 3G, 4G, 5G or higher) bands is mounted. According to exemplary embodiments, some sensing electrodes of the touch sensor may be distributed together with the antenna unit in the antenna-touch sensing regions AR.

The circuit connection region CR may include an outer peripheral region of the substrate layer 100 or the antenna-inserted electrode structure. As shown in FIG. 1, the antenna-touch sensing region AR may be disposed between the touch sensing region TR and the circuit connection region CR.

In some embodiments, a signal pad of the antenna unit may be disposed in the circuit connection region CR. Further, traces connected to the sensing electrodes may be branched and extend in the circuit connection region CR.

The antenna-inserted electrode structure may further include an integrated circuit (IC) chip for driving and controlling the touch sensor and the antenna unit. For example, an antenna driving IC chip 190 may be electrically connected to the signal pad of the antenna unit on one end of the substrate layer 100 of the circuit connection region CR. A touch sensor driving IC chip 195 may be disposed adjacent to the touch sensing region TR at the other end of the substrate layer 100 of the circuit connection region CR to be electrically connected with distal ends of the traces branched from the sensing electrodes.

In some embodiments, a flexible printed circuit board (FPCB) may be disposed between the antenna driving IC chip 190 and the signal pad, and between the touch sensor driving IC chip 195 and the distal end of the trace, respectively. For example, the antenna driving IC chip 190 may be directly mounted on the flexible printed circuit board.

In some embodiments, a relay circuit board (e.g., a main board of the image display device) such as a rigid printed circuit board (rigid-PCB) may be disposed between the antenna driving IC chip 190 and the flexible printed circuit board. For example, the antenna driving IC chip 190 may be directly mounted on the relay circuit board through surface mounting technology (SMT).

Figure 2:
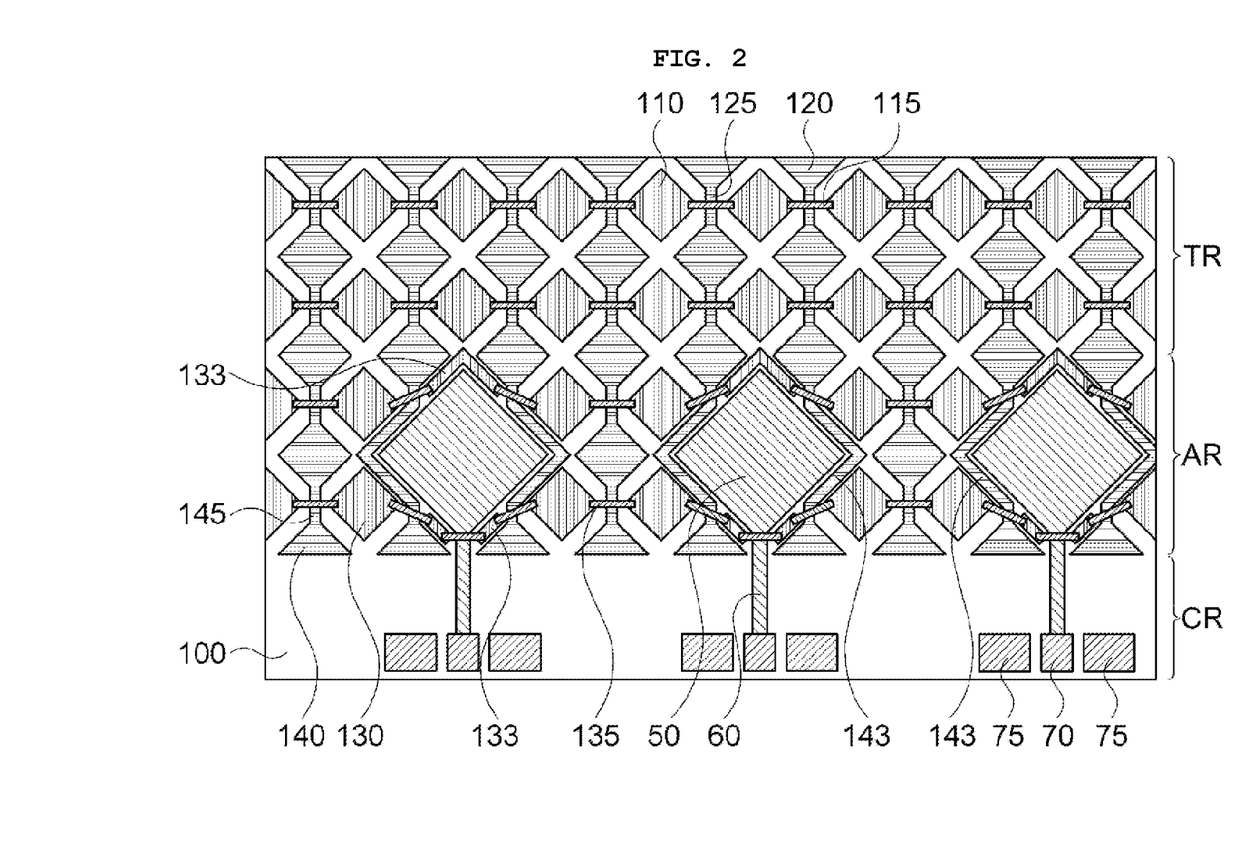
FIGS. 2 and 3 are a schematic plan view and a cross-sectional view illustrating an electrode structure and an arrangement of the antenna-inserted electrode structure according to exemplary embodiments, respectively.
Figure 3:
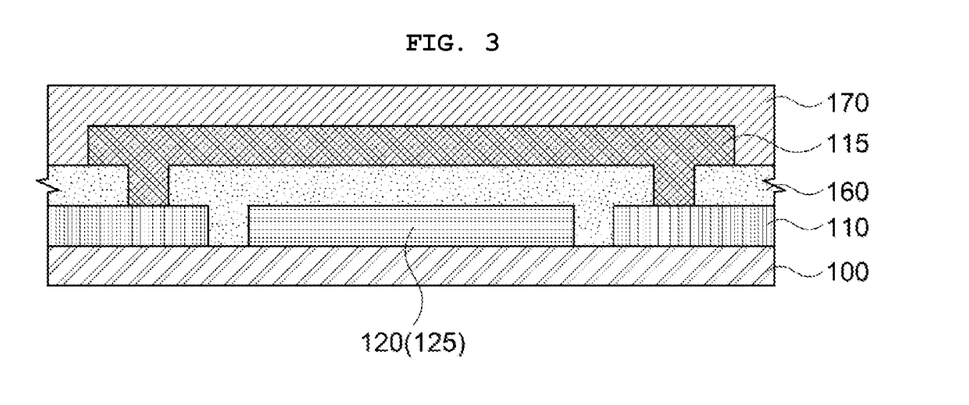

FIGS. 2 and 3 are a schematic plan view and a cross-sectional view illustrating an electrode structure and an arrangement of the antenna-inserted electrode structure according to exemplary embodiments, respectively. Specifically, FIG. 3 is a cross-sectional view illustrating a sensing electrode structure in the touch sensing region.

Referring to FIG. 2, the antenna-inserted electrode structure includes the antenna units and the sensing electrodes for sensing a touch, which are arranged on an upper surface of the substrate layer 100.

The substrate layer 100 is used as a meaning of encompassing a support layer or a film type base material for forming the sensing electrodes and the antenna units. For example, the substrate layer 100 may be made of a film material commonly used for a touch sensor or an antenna dielectric layer without particular limitation thereof.

For example, the substrate layer 100 may include a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acryl resin such as polymethyl (meth)acrylate, polyethyl (meth) acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; a polyimide resin such as nylon, aromatic polyimide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; an epoxy resin; a urethane or acrylic urethane resin, a silicone resin and the like. These may be used alone or in combination of two or more thereof.

The substrate layer 100 may include an adhesive material such as an optically clear adhesive (OCA), an optically clear resin (OCR) and the like. In some embodiments, the substrate layer 100 may include an inorganic insulation material such as silicon oxide, silicon nitride, silicon oxynitride, glass and the like.

In some embodiments, a dielectric constant of the substrate layer 100 may be adjusted in a range of about 1.5 to 12. If the dielectric constant exceeds about 12, a driving frequency is excessively reduced, such that driving of the antenna in a desired high frequency band may not be implemented.

In some embodiments, a layer or film member of the image display device, on which the antenna-inserted electrode structure is mounted, may be provided as the substrate layer 100. For example, an encapsulation layer or a passivation layer included in the display panel may be provided as the substrate layer 100.

The sensing electrodes may be arranged so as to be driven in a mutual capacitance method. The sensing electrodes may include first row sensing electrodes 110 and first column sensing electrodes 120, which are arranged on the touch sensing region TR. The sensing electrodes may include second row sensing electrodes 130 and second column sensing electrodes 140, which are arranged on the antenna-touch sensing region AR.

The first row sensing electrodes 110 and the second row sensing electrodes 130 are arranged in a row direction, and may have an independent island pattern shape, respectively. The first row sensing electrodes 110 adjacent to each other in the row direction may be electrically connected with each other through a first bridge electrode 115. The second row sensing electrodes 130 adjacent to each other in the row direction may be electrically connected with each other through a second bridge electrode 135.

Thereby, a first sensing electrode row extending in the row direction may be defined on the touch sensing region TR, and a plurality of the first sensing electrode rows may be arranged in a column direction. In addition, a second sensing electrode row extending in the row direction may be defined on the antenna-touch sensing region AR, and a plurality of the second sensing electrode rows may be arranged in the column direction.

The first column sensing electrodes 120 and the second column sensing electrodes 140 may be arranged in the column direction. The first column sensing electrodes 120 may be connected with each other by a first connection part 125. The first column sensing electrodes 120 and the first connection part 125 may be integrally connected with each other to be provided as a substantial single member. The second column sensing electrodes 140 may be connected with each other by a second connection part 145. The second column sensing electrodes 140 and the second connection part 145 may be integrally connected with each other to be provided as a substantial single member.

For example, the first column sensing electrodes 120 and the second column sensing electrodes 140 may extend in the column direction together through the first connection part 125 and the second connection part 145. Thereby, sensing electrode columns extending in the column direction over the touch sensing region TR and the antenna-touch sensing region AR may be defined. In addition, a plurality of the sensing electrode columns may be arranged in the row direction.

For example, the first connection part 125 and the second connection part 145 may have a bar shape extending in the column direction.

The above-described sensing electrodes 110, 120, 130 and 140, and the bridge electrodes 115 and 135 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy including at least one thereof. These may be used alone or in combination of two or more thereof.

In one embodiment, the sensing electrodes 110, 120, 130 and 140, and the bridge electrodes 115 and 135 may include silver (Ag) or a silver alloy (e.g., silver-palladium-copper (APC) alloy), or copper (Cu) or a copper alloy (e.g., a copper-calcium (CuCa) alloy) to implement a low resistance and fine line width pattern.

In some embodiments, the sensing electrodes 110, 120, 130 and 140, and the bridge electrodes 115 and 135 may include a transparent conductive oxide such as indium tin oxide (ITO), indium zinc oxide (IZO), zinc oxide (ZnOx), or indium zinc tin oxide (IZTO).

In some embodiments, the sensing electrodes 110, 120, 130 and 140, and the bridge electrodes 115 and 135 may include a lamination structure of a transparent conductive oxide and a metal layer. For example, the sensing electrodes 110, 120, 130 and 140, and the bridge electrodes 115 and 135 may include a double-layered structure of a transparent conductive oxide layer-metal layer or a triple-layered structure of a transparent conductive oxide layer-metal layer-transparent conductive oxide layer. In this case, resistance may be reduced while improving flexible properties by the metal layer, and corrosion resistance and transparency may be improved by the transparent conductive oxide layer.

The sensing electrodes 110, 120, 130 and 140, and the bridge electrodes 115 and 135 may include a blackening processing part. Accordingly, reflectance on the surfaces of the sensing electrodes 110, 120, 130 and 140, and the bridge electrodes 115 and 135 may be decreased, thereby reducing the pattern from being viewed due to light reflection.

In one embodiment, the surfaces of the metal layers included in the sensing electrodes 110, 120, 130 and 140, and the bridge electrodes 115 and 135 are converted into metal oxide or metal sulfide to form blackened layers. In one embodiment, blackened layers such as a black material coating layer or a plating layer may be formed on the sensing electrodes 110, 120, 130 and 140, and the bridge electrodes 115 and 135 or the metal layers. The black material coating layer or plating layer may include silicon, carbon, copper, molybdenum, tin, chromium, molybdenum, nickel, cobalt, or oxide, sulfide, or an alloy containing at least one of them.

The composition and thickness of the blackened layer may be adjusted in consideration of an effect of reducing reflectance.

The antenna unit may be disposed on the antenna-touch sensing region AR, and the second row sensing electrodes 130 and the second column sensing electrodes 140 may be arranged around the antenna unit. For example, a plurality of antenna units may be arranged in the row direction.

The antenna unit may include a radiator 50, a transmission line 60, and a signal pad 70. The radiator 50 may have a polygonal plate shape, for example, and a transmission line 60 may extend with being branched from the radiator 50. The signal pad 70 may be electrically connected with a distal end of the transmission line 60.

The radiator 50 may be arranged together with the second row sensing electrodes 130 and the second column sensing electrodes 140 on the antenna-touch sensing region AR. The signal pad 70 may be disposed on the circuit connection region CR. The transmission line 60 may extend from the radiator 50 to be connected with the signal pad 70 on the circuit connection region CR.

In some embodiments, ground pads 75 may be further disposed on the circuit connection region CR. For example, a pair of ground pads 75 may be disposed around the signal pad 70 with being spaced apart from the signal pad 70 with the signal pad 70 interposed therebetween.

The antenna unit may include a conductive material which is substantially the same as or similar to the sensing electrodes 110, 120, 130 and 140. For example, the antenna unit may include the above-described metal or alloy, or transparent conductive oxide, and may have a multilayer structure of a metal layer and a transparent conductive oxide.

For example, the antenna unit may include the above-described blackening processing part.

According to exemplary embodiments, the antenna unit may be formed on the same layer or at the same level as the sensing electrodes 110, 120, 130 and 140. For example, a conductive layer including the above-described metal or alloy (e.g., Cu—Ca or APC) or transparent conductive oxide may be formed on the upper surface of the substrate layer 100. The sensing electrodes 110, 120, 130 and 140 and the antenna unit may be formed together by etching the conductive layer.

By including the antenna unit together with the sensing electrodes 110, 120, 130 and 140 of the touch sensor on the same layer or at the same level, it is possible to prevent radiation (e.g., vertical radiation) of the antenna unit from being shielded or disturbed by the sensing electrodes 110, 120, 130 and 140 to secure characteristics thereof, while reducing the thickness of the antenna-inserted electrode structure.

As shown in FIG. 3, an insulation layer 160 may be formed on the upper surface of the substrate layer 100 to cover the antenna unit and the sensing electrodes 110, 120, 130 and 140 together. The bridge electrodes 115 and 135 may be formed on the insulation layer 160. The bridge electrodes 115 and 135 may penetrate the insulation layer 160 to electrically connect the neighboring row sensing electrodes 110 and 130 with each other.

A passivation layer 170 may be formed on the insulation layer 160 to cover the bridge electrodes 115 and 135. The insulation layer 160 and the passivation layer 170 may include an inorganic insulation material such as silicon oxide or silicon nitride, or an organic insulation material such as an acrylic resin or siloxane resin.

According to exemplary embodiments, the radiator 50 may have substantially the same shape as the second row sensing electrode 130 and the second column sensing electrode 140, and may have an area larger than each of the second row sensing electrode 130 and the second column sensing electrode 140.

For example, the radiator 50, the second row sensing electrode 130, and the second column sensing electrode 140 may have a rhombic or diamond shape, respectively. In one embodiment, the second row sensing electrode 130 and the second column sensing electrode 140 may have an area smaller than the radiator 50, which may correspond to 4n-division of the radiator 50, for example. Herein, n is a natural number, and may be, for example, 1 to 4.

The term "area corresponding to 4n-division" as used herein should be understood as a concept that it is exactly the same as an area obtained by 4n-division ('4n-division area'), as well as it is substantially formed through 4n-division and includes a tolerance/allowable error for independence, alignment/arrangement/connection, etc. between electrodes.

In one embodiment, the second row sensing electrode 130 and the second column sensing electrode 140 may substantially correspond to 4-division of the radiator 50.

In some embodiments, the sensing electrodes 110 and 120 included in the touch sensing region TR may also have the same area as the sensing electrodes 130 and 140 included in the antenna-touch sensing region AR.

In some embodiments, as described below with reference to FIG. 4, the sensing electrodes 110 and 120 included in the touch sensing region TR may have an area larger than the sensing electrodes 130 and 140 included in the antenna-touch sensing region AR.

In some embodiments, the sensing electrodes 110 and 120 included in the touch sensing region TR may have an area smaller than the sensing electrodes 130 and 140 included in the antenna-touch sensing region AR.

In some embodiments, the radiator 50 may be formed in a shape different from the second row sensing electrode 130 and the second column sensing electrode 140. For example, the second row sensing electrode 130 and the second column sensing electrode 140 may have a bar shape, and the radiator 50 may have a rectangular shape. Further, the shapes of the radiator 50, the second row sensing electrode 130, and the second column sensing electrode 140 may be variously changed in consideration of a circuit design of the touch sensor, a space restriction of the image display device and the like.

According to exemplary embodiments, the second bridge electrode 135 and the second connection part 145 may be disposed by avoiding the radiator 50 when seeing in a planar direction.

In some embodiments, the second row sensing electrodes 130 may include sub-row sensing electrodes 133 disposed around the radiator 50. For example, the sub-row sensing electrode 133 may have a bar pattern or a bent pattern shape extending along a shape of an edge of the radiator 50.

The sub-row sensing electrodes 133 may be connected with the adjacent second row sensing electrodes 130 through the second bridge electrode 135 to form the second sensing electrode row.

In some embodiments, among the second connection parts 145, a second connection part 145 adjacent to the radiator 50 (hereinafter, may be referred to as a modified connection part 143) may have a modified shape. For example, the modified connection part 143 may have a line shape including a bent portion along a profile of an edge of the radiator 50.

According to the above-described exemplary embodiments, the areas of the sensing electrodes 130 and 140 may be formed smaller than the radiator 50 in the antenna-touch sensing region AR. Thereby, it is possible to more easily avoid disconnection of the bridge electrode and/or the connection part, which is generated due to a difference in a pitch (e.g., a half wavelength of a resonance frequency) of the radiators 50 for implementing radiation of a plurality of antenna units and a pitch of the sensing electrodes 130 and 140.

In addition, by using the sub-row sensing electrode 133 and the modified connection part 143, continuity of the second sensing electrode row and the second sensing electrode column around the radiator 50 may be maintained.

In some embodiments, in order to maintain the continuity of the rows of the second sensing electrodes adjacent to the circuit connection region CR, some of the second bridge electrodes 135 may extend above the transmission line 60 of the antenna unit. In one embodiment, the second bridge electrode 135 above the transmission line 60 may be omitted to prevent disturbance of current and electric field flow in the antenna unit (see FIG. 5).

In some embodiments, the area of the radiator 50 may be smaller than or equal to the areas of the sensing electrodes 110, 120, 130 and 140.

Even in this case, the radiators 50 may be disposed so as to avoid the second bridge electrodes 135 and the second connection parts 145 in the antenna-touch sensing region AR. For example, as shown in FIG. 2, the second bridge electrodes 135 and the second connection parts 145 may be arranged together along virtual straight lines (alignment lines) in the column direction in FIG. 2 while intersecting each other in the planar direction.

The radiators 50 may be arranged, for example, in the row direction so that each central portion is disposed between the alignment lines in the planar direction.

Figure 4:
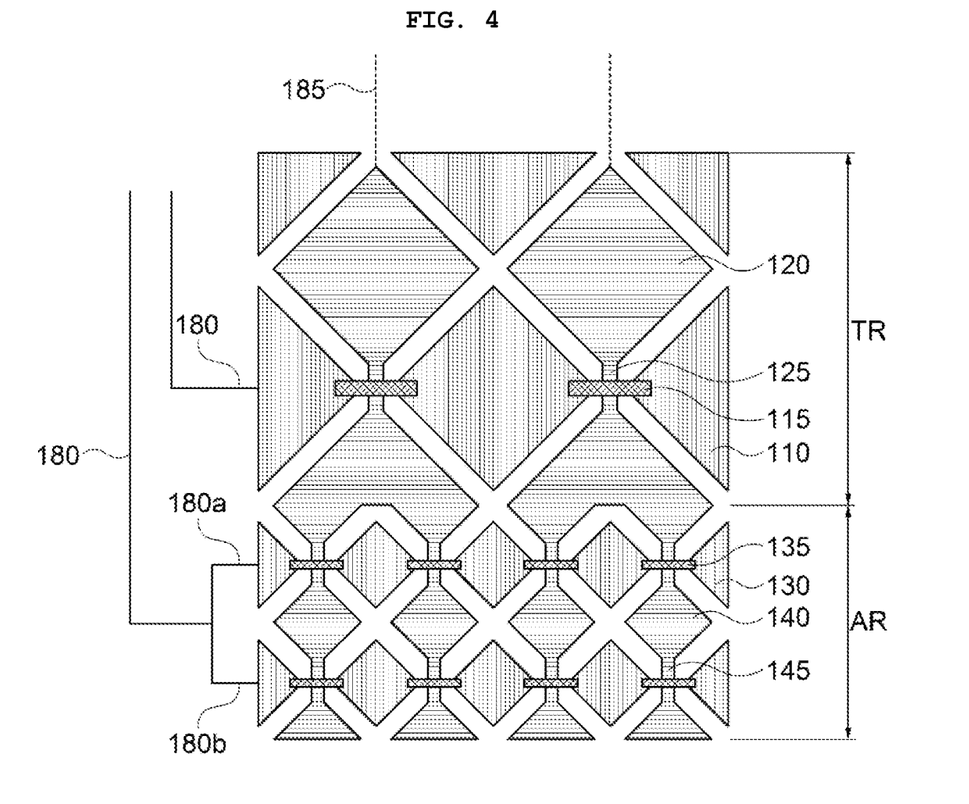
FIG. 4 is a schematic partially enlarged plan view illustrating an electrode structure and an arrangement of an antenna-inserted electrode structure according to some exemplary embodiments.

FIG. 4 is a schematic partially enlarged plan view illustrating an electrode structure and an arrangement of an antenna-inserted electrode structure according to some exemplary embodiments.

Referring to FIG. 4, the sensing electrodes 110 and 120 disposed on the touch sensing region TR may have a larger area than the sensing electrodes 130 and 140 disposed on the antenna-touch sensing region AR.

In one embodiment, the first row sensing electrode 110 may have a larger area than the area of the second row sensing electrode 130. For example, the second row sensing electrode 130 may substantially correspond to 4n-division (n is a natural number, for example, 1 to 4) of the first row sensing electrode 110, and may correspond to, for example, a quarter thereof.

The first column sensing electrode 120 may have a larger area than the area of the second column sensing electrode 140. For example, the second column sensing electrode 140 may substantially correspond to 4n-division (n is a natural number, for example, 1 to 4) of the first column sensing electrode 120, and may correspond to, for example, a quarter thereof.

In the touch sensing region TR, by increasing the area of the sensing electrodes 110 and 120, a resistance of the sensing channel may be reduced while securing easiness in the patterning process.

In addition, as described above, sensing electrodes 130 and 140 having a smaller size may be inserted in the antenna-touch sensing region AR in consideration of the pitch of the antenna unit. Accordingly, it is possible to secure radiation characteristics in the antenna unit, as well as channel characteristics for touch sensing around the antenna unit.

A row trace 180 and a column trace 185 may extend from distal ends of the above-described sensing electrode row and sensing electrode column, respectively.

In some embodiments, as shown in FIG. 4, a plurality of (e.g., two) sensing electrode rows disposed in the antenna-touch sensing region AR may be merged into one sensing electrode row in the touch sensing region TR. Thereby, one column trace may be branched for each sensing electrode column.

The row trace 180 (e.g., a first row trace) may extend for each first sensing electrode row disposed in the touch sensing region TR, and a plurality of second sensing electrode rows (e.g., two second sensing electrode rows) disposed in the antenna-touch sensing region AR may be merged and coupled to one row trace 180 (e.g., a second row trace).

For example, in the antenna-touch sensing region AR, a first sub-row trace 180*a* and a second sub-row trace 180*b* may be merged into one row trace 180.

Figure 5:
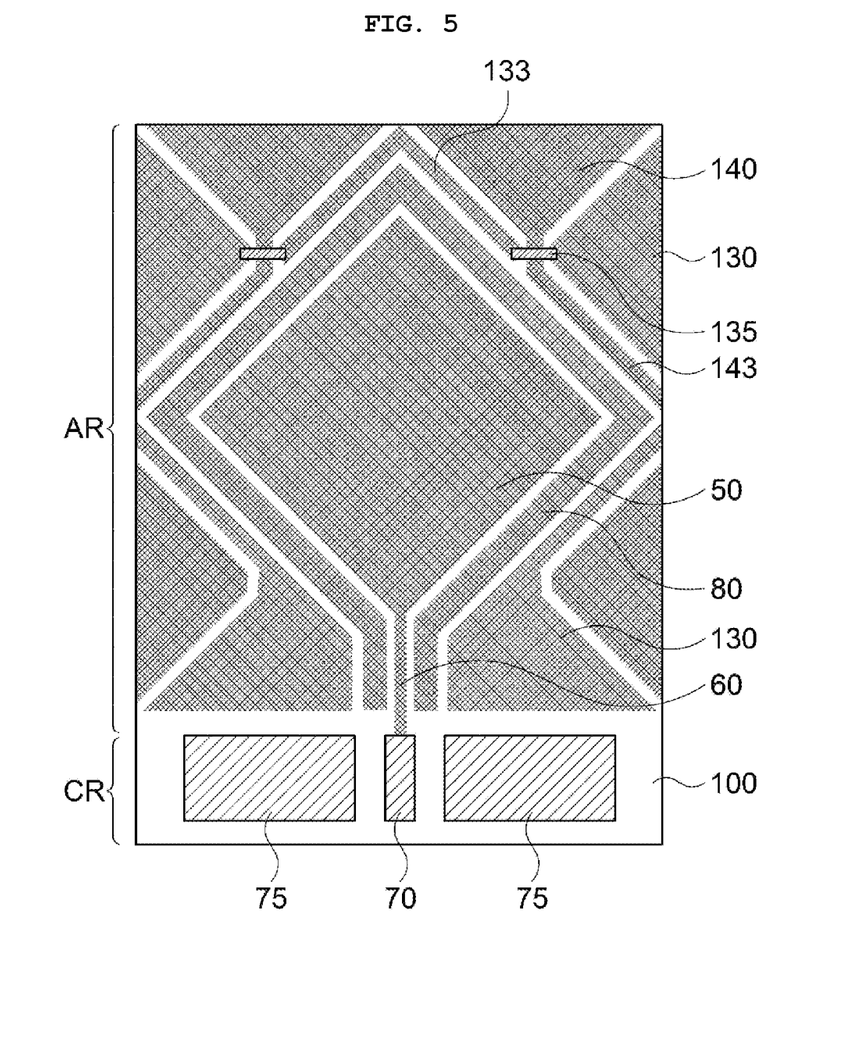
FIG. 5 is a schematic partially enlarged plan view illustrating an electrode structure and an arrangement of an antenna-inserted electrode structure according to some exemplary embodiments.

FIG. 5 is a schematic partially enlarged plan view illustrating an electrode structure and an arrangement of an antenna-inserted electrode structure according to some exemplary embodiments.

Referring to FIG. 5, the antenna units, for example, the radiator 50 and the transmission line 60 may have a mesh structure. In some embodiments, the sensing electrodes 110, 120, 130 and 140 may also include the mesh structure.

A dummy mesh pattern 80 may be disposed around the radiator 50. The dummy mesh pattern 80 may be disposed between the radiator 50 and the second row and second column sensing electrodes 130 and 140 in the planar direction.

As the dummy mesh pattern 80 is disposed, noise and mutual signal interference between the radiator 50 and the sensing electrodes 130 and 140 may be absorbed or blocked. Further, due to the dummy mesh pattern 80, a variation in distribution of conductors around the radiator 50 may be decreased, thereby suppressing or reducing a phenomenon in which the electrode is viewed.

The dummy mesh pattern 80 may be formed to surround the radiator 50 with being spaced apart from the radiator 50. The dummy mesh pattern 80 may extend to the circuit connection region CR to be also disposed around the transmission line 60.

In some embodiments, the signal pad 70 and the ground pads 75 may be formed in a solid metal pattern to reduce bonding resistance and power supply resistance with the antenna driving IC chip 190.

In some embodiments, the bridge electrodes 115 and 135 may have a solid structure to reduce channel resistance. For example, the bridge electrodes 115 and 135 may be a solid pattern containing a transparent conductive oxide such as ITO.

Figure 6:
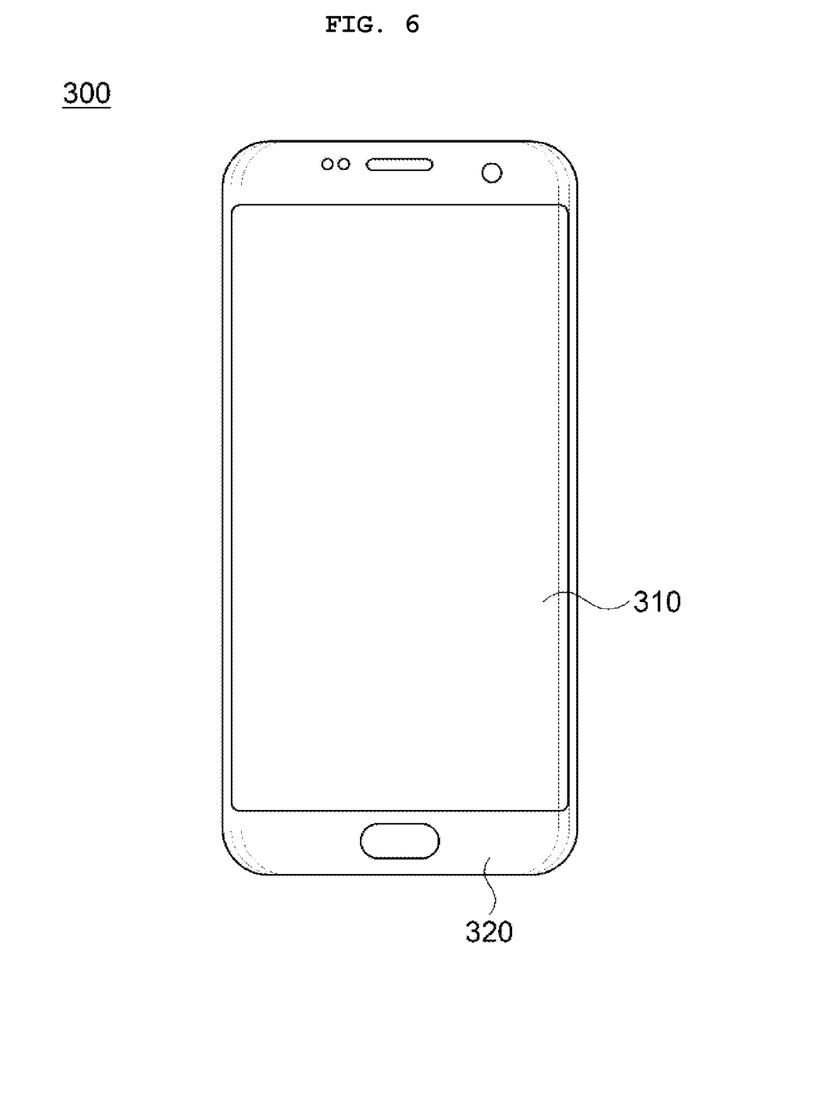
FIG. 6 is a schematic plan view illustrating an image display device according to exemplary embodiments.

FIG. 6 is a schematic plan view illustrating an image display device according to exemplary embodiments. For example, FIG. 6 illustrates an external shape including a window of the display device.

Referring to FIG. 6, a display device 300 may include a display region 310 and a peripheral region 320. The peripheral region 320 may be disposed on both sides and/or both ends of the display region 310, for example. The peripheral region 320 may correspond to a light-shielding part or a bezel part of the image display device, for example.

The touch sensing region TR and the antenna-touch sensing region AR of the antenna-inserted electrode structure described with reference to FIG. 1 may be included in the display region 310. Accordingly, the sensing electrodes 110, 120, 130 and 140, and the radiator 50 may be arranged in the display region 310. As described above, it is possible to prevent the radiators 50, and the sensing electrodes 110, 120, 130 and 140 from being viewed by a user by using the mesh structure.

The circuit connection region CR of the antenna-inserted electrode structure may be included in the peripheral region 320. Thereby, electrical connection with the antenna driving IC chip 190 may be implemented in the peripheral region 320 through the signal pad 70.

Further, distal ends of the traces 180 and 185 may be electrically connected with the touch sensor driving IC chip 195 in the peripheral region 320.

What is claimed is:

1. An antenna-inserted electrode structure comprising:
    a substrate layer comprising a touch sensing region and an antenna-touch sensing region;
    first sensing electrodes arranged in the touch sensing region of the substrate layer;
    second row sensing electrodes and second column sensing electrodes which are arranged in the antenna-touch sensing region of the substrate layer;
    second bridge electrodes configured to connect the second row sensing electrodes adjacent to each other in a row direction;
    second connection parts configured to connect the second column sensing electrodes adjacent to each other in a column direction; and
    a plurality of antenna units respectively comprising radiators which are disposed in the antenna-touch sensing region of the substrate layer, and are disposed by avoiding the second bridge electrodes and the second connection parts in a planar direction,
    wherein the second row sensing electrodes are disposed around the radiator, and comprise sub-row sensing electrodes having a bar pattern or a bent pattern shape extending along an edge of the radiator.

2. The antenna-inserted electrode structure according to claim 1, wherein the first sensing electrodes comprise:
    first row sensing electrodes and first column sensing electrodes;
    first bridge electrodes configured to connect the first row sensing electrodes adjacent to each other in the row direction; and
    first connection parts configured to connect the first column sensing electrodes adjacent to each other in the column direction.

3. The antenna-inserted electrode structure according to claim 2, wherein the first row sensing electrode and the second row sensing electrode have the same area, and the first column sensing electrode and the second column sensing electrode have the same area.

4. The antenna-inserted electrode structure according to claim 2, wherein the first row sensing electrode has a larger area than the second row sensing electrode, and the first column sensing electrode has a larger area than the second column sensing electrode.

5. The antenna-inserted electrode structure according to claim 4, wherein the second row sensing electrode and the second column sensing electrode correspond to 4n-division (n is a natural number) of the first row sensing electrode and the first column sensing electrode, respectively.

6. The antenna-inserted electrode structure according to claim 4, wherein the first row sensing electrodes are connected with each other in the row direction to form first sensing electrode rows, and the second row sensing electrodes are connected with each other in the row direction to form second sensing electrode rows.

7. The antenna-inserted electrode structure according to claim 6, further comprising:
    first row traces which extend from each of the first sensing electrode rows in the touch sensing region; and
    a second row trace which merges the plurality of second sensing electrode rows and extends in the antenna-touch sensing region.

8. The antenna-inserted electrode structure according to claim 1, wherein all the first sensing electrodes, the second row sensing electrodes, the second column sensing electrodes, and the antenna units are disposed on the same layer or at the same level.

9. The antenna-inserted electrode structure according to claim 1, wherein the antenna unit further comprises a transmission line extending from the radiator.

10. The antenna-inserted electrode structure according to claim 9, wherein the radiator and the transmission line have a mesh structure.

11. The antenna-inserted electrode structure according to claim 10, wherein the first sensing electrodes, the second row sensing electrodes, and the second column sensing electrodes have the same mesh structure as the radiator.

12. The antenna-inserted electrode structure according to claim 11, wherein the second bridge electrodes have a solid structure.

13. The antenna-inserted electrode structure according to claim 10, further comprising a dummy mesh pattern which surrounds peripheries of the radiator.

14. The antenna-inserted electrode structure according to claim 10, wherein the antenna unit further comprises a signal pad connected to one end of the transmission line and having a solid pattern structure.

15. The antenna-inserted electrode structure according to claim 1, wherein the radiator has a larger area than an area of each of the second row sensing electrode and the second column sensing electrode.

16. The antenna-inserted electrode structure according to claim 15, wherein each of the second row sensing electrode or the second column sensing electrode corresponds to 4n-division (n is a natural number) of the radiator.

17. The antenna-inserted electrode structure according to claim 1, wherein central portions of the radiators are disposed between alignment lines in which the second bridge electrodes and the second connection parts are respectively arranged in the planar direction.

18. An image display device comprising the antenna-inserted electrode structure according to claim 1.

19. An antenna-inserted electrode structure comprising:
a substrate layer comprising a touch sensing region and an antenna-touch sensing region;
first sensing electrodes arranged in the touch sensing region of the substrate layer;
second row sensing electrodes and second column sensing electrodes which are arranged in the antenna-touch sensing region of the substrate layer;
second bridge electrodes configured to connect the second row sensing electrodes adjacent to each other in a row direction;
second connection parts configured to connect the second column sensing electrodes adjacent to each other in a column direction; and
a plurality of antenna units respectively comprising radiators which are disposed in the antenna-touch sensing region of the substrate layer, and are disposed by avoiding the second bridge electrodes and the second connection parts in a planar direction,
wherein the second connection parts comprise a modified connection part which extends along an edge of the radiator around the radiator and includes a bent portion.

20. An image display device comprising the antenna-inserted electrode structure according to claim 19.

* * * * *